(12) United States Patent
Tian

(10) Patent No.: US 11,010,337 B2
(45) Date of Patent: May 18, 2021

(54) FUZZY HASH ALGORITHMS TO CALCULATE FILE SIMILARITY

(71) Applicant: McAfee, LLC, Santa Clara, CA (US)

(72) Inventor: Di Tian, Portland, OR (US)

(73) Assignee: McAfee, LLC, San Jose, CA (US)

( * ) Notice: Subject to any disclaimer, the term of this patent is extended or adjusted under 35 U.S.C. 154(b) by 426 days.

(21) Appl. No.: 16/119,716

(22) Filed: Aug. 31, 2018

(65) Prior Publication Data
US 2020/0073959 A1 Mar. 5, 2020

(51) Int. Cl.
*G06F 16/13* (2019.01)
*G06F 21/56* (2013.01)
*G06N 7/02* (2006.01)
*G06F 16/14* (2019.01)

(52) U.S. Cl.
CPC .......... *G06F 16/137* (2019.01); *G06F 16/152* (2019.01); *G06F 21/56* (2013.01); *G06F 21/561* (2013.01); *G06F 21/564* (2013.01); *G06F 21/565* (2013.01); *G06N 7/023* (2013.01); *G06F 2221/034* (2013.01)

(58) Field of Classification Search
CPC ...... G06F 16/137; G06F 16/152; G06F 21/56; G06F 21/561; G06F 21/564; G06F 21/565; G06F 2221/034; G06N 7/023
USPC .......................................................... 726/26
See application file for complete search history.

(56) References Cited

U.S. PATENT DOCUMENTS

| | | | |
|---|---|---|---|
| 2011/0093426 A1* | 4/2011 | Hoglund | G06F 21/562 706/52 |
| 2013/0151562 A1* | 6/2013 | Fujii | G06F 16/1748 707/780 |
| 2015/0178306 A1* | 6/2015 | Yang | G06F 16/122 707/737 |

* cited by examiner

*Primary Examiner* — Michael S McNally
(74) *Attorney, Agent, or Firm* — Hanley, Flight & Zimmerman, LLC

(57) ABSTRACT

Methods, apparatus, systems and articles of manufacture to classify a first file are disclosed herein. Example apparatus include a feature hash generator to generate respective sets of one or more feature hashes for respective features of the first file. The number of the one or more feature hashes to be generated is based on an ability of the feature to distinguish the first file from a second file. The apparatus also includes a bit setter to set respective bits of a first fuzzy hash value based on respective ones of the one or more feature hashes, a classifier to assign the first file to a class associated with a second file based on a similarity between the first fuzzy hash value and a second fuzzy hash value for a second file.

24 Claims, 8 Drawing Sheets

FUZZY HASH ALGORITHMS TO CALCULATE FILE SIMILARITY

FIELD OF THE DISCLOSURE

This disclosure relates generally to calculating file similarity, and, more particularly, to fuzzy hash algorithms to calculate file similarity.

BACKGROUND

Systems to analyze computer files for the presence of malware often use file classification techniques to identify files that are similar to each other. The files identified as being similar are grouped together in cluster samples which are then analyzed using any of a variety of techniques to detect and/or better understand the presence (or absence) of malware. As conclusions are drawn based on analyses performed on the cluster samples, the ability to accurately identify files that are similar can have a significant impact on the validity of the conclusions. For example, when a file classification technique that falsely identifies files as being similar (or fails to identify files that are similar) is used to generate cluster samples, the results of any analyses performed on the cluster samples are questionable at best and erroneous at worst.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
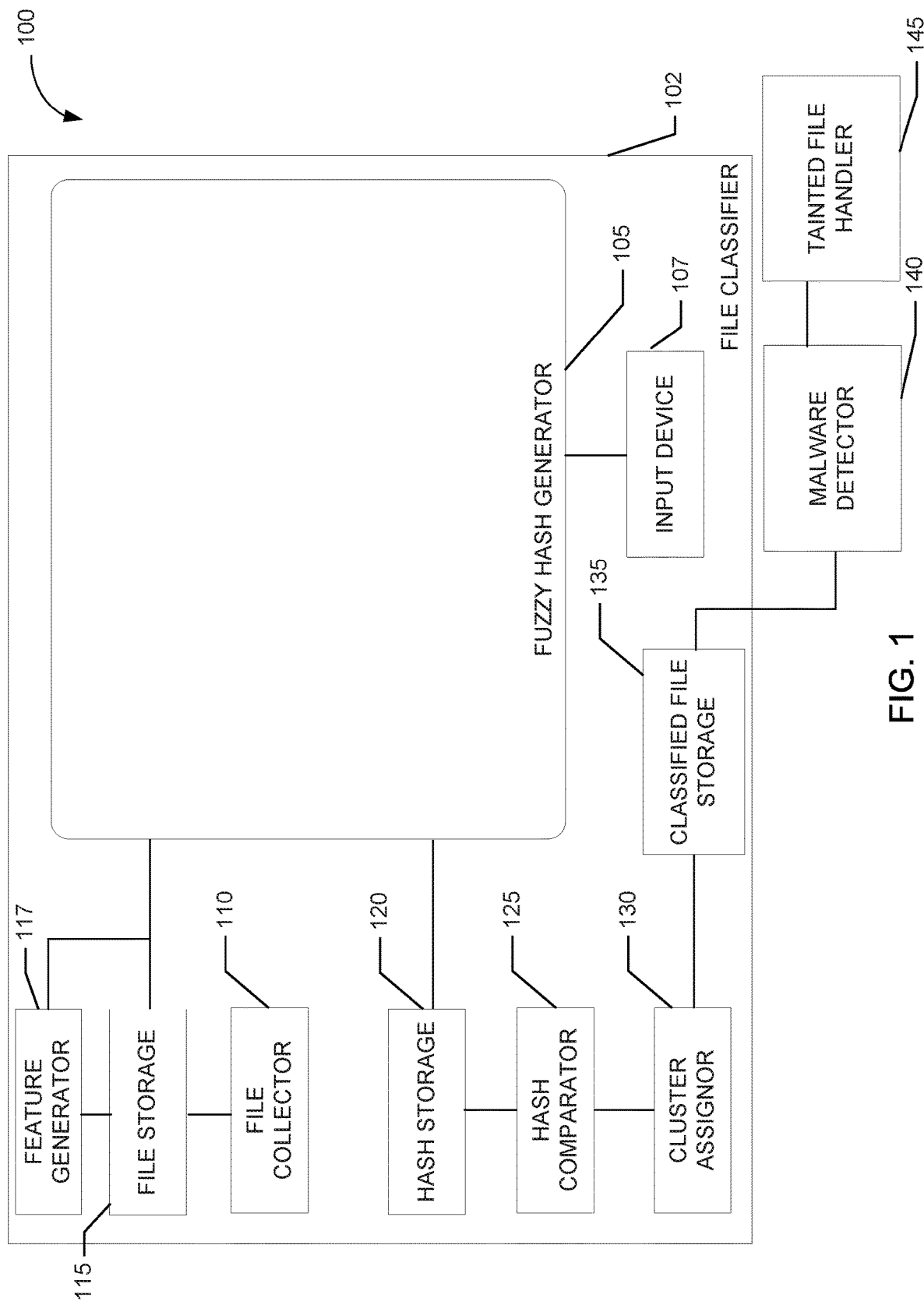
FIG. 1 is a diagram illustrating an example file processing system having a file classifier implemented in accordance with the teachings of this disclosure.

When analyzing computer files, sample clusters techniques are often used to identify files having sufficient similarity to place the files into a same cluster. The files identified as being sufficiently similar are grouped together in cluster samples. The cluster samples are then analyzed using any of a variety of techniques. Some existing methods to identify files to be placed into a same cluster generate hashes based on the files and then compare the hashes to determine whether sufficient similarity exists to support clustering the files together. Two commonly used hash generating techniques are md5 and SHA1. However, the md5 and SHA1 hash generating techniques only cluster two files together when the file features used to generate the corresponding hashes are identical, not merely similar. Two commonly used hash generating techniques, referred to as Ssdeep and Bitshred, are designed to identify similar files (e.g., not only identical files), however, Ssdeep and Bitshred determine similarity between binary data files but cannot determine similarity between multiple types of data or file features. Further, Ssdeep and Bitshred treat all file features as having equal significance when determining whether two files are similar, even though some file features are far more likely to be associated with, for example, a specific malware family. Additionally, some files have a large number of file features that can be evaluated for purposes of determining similarities yet, existing methods to identify similar files, such as Bitshred, are often not scalable and are therefore not able to process a large number of file features when the length of the hash value to be generated is limited. Some existing techniques, such as Ssdeep, are capable of generating hash values of varying lengths but hash values of varying lengths can be present storage difficulties in systems that have predefined storage limits. Lastly, the results derived using some existing techniques, such as Ssdeep, are often difficult to interpret and difficult to tune/adjust when too many false positives are identified. As used herein, "file" refers to any computer document, executable file, computer script, executable code, etc.

The fuzzy hash generator disclosed herein overcomes the problems associated with conventional file classification techniques by generating fuzzy hash values that have a fixed length, by generating a single hash value from any of a number of different types of file features, and by placing a greater emphasis on file features that have a greater clustering significance. Further, the results of the fuzzy hash values generated with the fuzzy hash generator disclosed herein are easy to understand and example fuzzy hash generator algorithms disclosed herein can be easily tuned, as needed, to reduce the number of false positives generated using the algorithms. As such, the fuzzy hash generator disclosed herein is more robust than conventional techniques and more accurate. Further, any analysis performed using file clusters generated based on the disclosed fuzzy hash generator are more accurate, reliable, and scalable.

FIG. 1 is a block diagram of an example file processing system 100 having an example file classifier 102 that includes an example fuzzy hash generator 105, an example input device 107, an example file collector 110, an example file storage 115, an example file feature generator 117, an example hash storage 120, an example hash comparator 125, an example cluster assignor 130, and an example classified file storage 135. In some examples, the file processing system 100 further includes an example malware detector 140 and an example tainted file handler 145. In some examples, the file collector 110 collects or receives files to be classified. In some examples, the files are to be classified into one or more categories of file types, file classes, and/or file clusters. The files belonging to a same type, class and/or cluster are determined by the malware detector 140 to be either malignant (e.g., containing malware) or benign (not containing malware).

In some examples, the files collected by the example file collector 110 are stored in an example file storage 115. In some examples, the example file feature generator 117 analyzes the files as a group to identify a set of features to be used to generate feature hashes which will then be used to generate the fuzzy hash values. In some examples, the set of features to be used to generate the feature hashes are based on use cases and/or customer requirements. In some examples, features to be used to generate the feature hashes are based on a type of clustering problem on which the file processing system 100 is operating. In some examples, when dynamic file behaviors are being considered, the file feature generator 117 chooses/generates a list of features that includes dynamic features. In some examples, when static file features are being considered, the file feature generator 117 chooses/generates a list of features that includes static features. In some examples, when binary file behaviors are being considered, the file feature generator 117 chooses/generates a list of features that includes binary features. In some examples, the file feature generator 117 chooses/generates any or all of dynamic, static and/or binary types of features.

In some examples, the file feature generator 117 extracts the file features from the files/documents and supplies the file features to the file storage 115 for storage with (or in association with) the corresponding file. In some examples, when a dynamic feature is to be used to generate a feature hash for a file, the file feature generator 117 extracts the dynamic feature from events captured when replicating the file. In some examples, when a static feature is to be used to generate a feature hash from the file, the file feature generator 117 extracts the static feature from the file content such as the file header, or a file string from a portable executable file. Similarly, the file feature generator 117 extracts binary features from binary code of a file (e.g., the n continuous bytes from a portable executable file code section). In some examples, a set of features is generated for each file/document and stored in association with the file/document.

In some examples, the sets of features and/or the files are retrieved by the fuzzy hash generator 105. The fuzzy hash generator 105 generates fuzzy hash values for the files stored in the file storage 115. The fuzzy hash generator 105 supplies the fuzzy hash values to the hash storage 120 where the fuzzy hash values are stored along with information identifying the files for which the fuzzy hash values were generated.

In some examples, the example hash comparator 125 compares the fuzzy hash values stored in the example hash storage 120. When a comparison between two fuzzy hash values yields a similarity value that meets a similarity threshold, the example cluster assignor 130 assigns the files corresponding to each of the fuzzy hash values to a same file cluster. In some examples, the cluster assignor 130 causes the files to be stored in the example classified file storage 135 with information identifying the file cluster to which the corresponding files were assigned. In some examples, the example malware detector 140 determines whether the clusters stored in the classified file storage 135 contain files associated with malware. The malware detector 140 can use any of a variety of techniques to determine whether the clusters of files contain or are otherwise associated with malware. In some examples, when one of three files determined to be similar is known to contain malware, then the other two files are highly likely to contain malware. Similarly, if one of three files determined to be similar is known to contain benign content, then the other two files are highly likely to contain benign content. In yet other circumstances when a first of three files determined to be similar is known to contain benign content and a second of the three files is known to contain malware, then a conclusion cannot reasonably be drawn as to the content of the third file. The example tainted file handler 145 can initiate a malware protocol to handle the files determined to be associated with malware. The malware protocol can include taking any number of actions including, file quarantine/file isolation actions, file delete/file removal actions and/or file repair/file recovery actions.

In some examples, the hash comparator 125 uses a Jaccard function to compare a first fuzzy hash value A to a second fuzzy hash value and determine whether the comparison indicates that the hash values are similar enough to classify the corresponding files as belonging to a same cluster. In some such examples, the hash comparator 125 calculates an amount of similarity between A and B by determining a value for "P/(P+Q+R)" where "P" is equal to a total number of bit positions set to "1" that are shared by both A and B, where "Q" is equal to a total number of bit positions set to "1" for A, but not B, and where "R" is equal to a total number of bit positions set to "1" for B, but not A. If the results of "P/(P+Q+R)" satisfy a similarity threshold (e.g., "P/(P+Q+R)">0.8), then the file corresponding to A and the file corresponding to B are assigned to a same cluster. Otherwise, the files are not assigned to a cluster.

Figure 2:
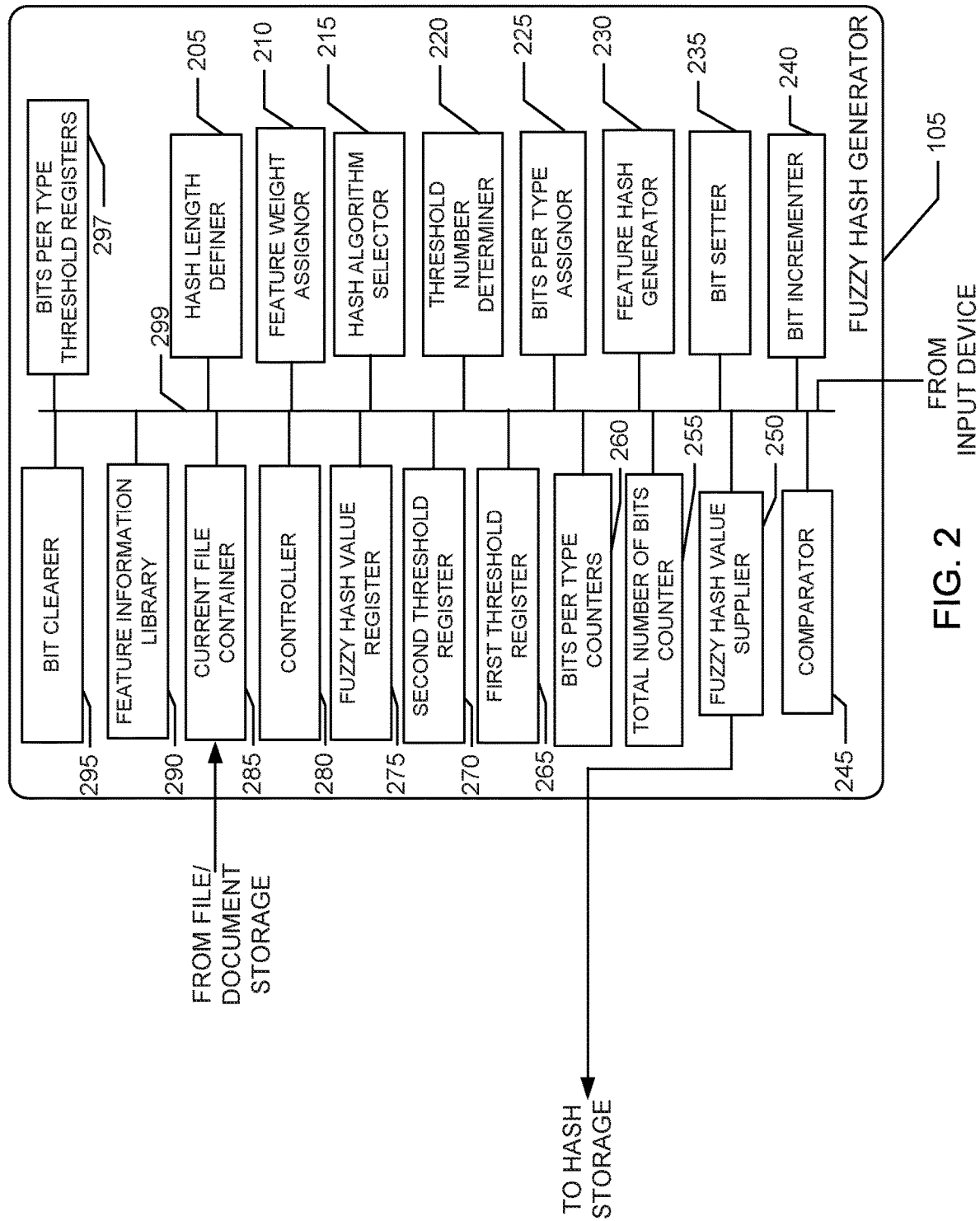
FIG. 2 is a block diagram of an example fuzzy hash generator of the example file classifier of FIG. 1.

FIG. 2 is a block diagram of the example fuzzy hash generator 105 of FIG. 1 configured to generate fuzzy hash values for files contained in the file storage 115 (see FIG. 1). In some examples, the fuzzy hash generator 105 includes an example hash length definer 205, an example feature weight assignor 210, an example hash algorithm selector 215, an example threshold number determiner 220, an example bit per type assignor 225, an example feature hash generator 230, an example bit setter 235, an example bit incrementer 240, an example comparator 245, an example fuzzy hash value supplier 250, an example first total number of bits counter 255, example bits per type counters 260, an example first threshold register 265, an example second threshold register 270, an example fuzzy hash value register 275, an example controller 280, an example current file container 285, an example feature information library 290, an example bit clearer 295, and example bits per type threshold registers 297, coupled via an example communication bus 299. In some examples, the fuzzy hash generator 105 begins a fuzzy hash value generation process when the controller 280 causes a file and corresponding file features retrieved from and/or received from the file storage 115 to be placed into the current file container 285. In response to the storage of the file and/or file features in the current file container 285, the fuzzy hash generator 105 operates to generate a fuzzy hash value that represents the file currently stored in the current file container 285 in the manner described below.

In some examples, the example controller 280 notifies the example hash length definer 205 that a new file is stored in the current file container 285. In response, to the notification, the hash length definer 205 defines a fixed length for the fuzzy hash value to be generated. In some examples, the fixed length corresponds to a number of bytes (each including eight bits) to be included in the fuzzy hash value to be generated. In some examples, the fixed length of the fuzzy hash values to be generated is defined based on a storage limit of the example hash storage 120. The storage limit of the hash storage 120 can be expressed as a length of a fuzzy hash value (in bytes) multiplied by a number of files for which fuzzy hash values are to be generated. In some such examples, a fixed length for the fuzzy hash values can be derived by dividing an available amount of storage (e.g., the size of the hash storage 120) by the number of files for which the fuzzy hash values are to be generated. In some examples, when the hash storage 120 is large enough, the fuzzy hash values can each include thousands of bytes. In some examples, the hash length definer 205 defines the hash length based on user input supplied to the fuzzy hash generator 105 by the example input device 107 (see FIG. 2). The hash length definer 205 causes the example fuzzy hash value register 275 to be adjusted to include a number of bit positions/bytes equal to the defined length of the fuzzy hash. In some examples, the controller 280 also notifies the example bit clearer 295 when the file/document and/or file features have been placed into the current file container 285. In response, the bit clearer 295 prepares for the generation of a fuzzy hash value based on the new file/document by clearing all of the bit positions of the fuzzy hash value register 275 and clearing any counters and/or registers (e.g., the example total number of bits counter 255, the example bits per type counters 260, the example first threshold register 265, the example second threshold register 270, the example bits per type threshold registers 297) that were set with values during an earlier generation of a different fuzzy hash value. Clearing the values/bit positions can include setting all bits to zeros.

The example feature weight assignor 210 accesses the file/document features stored in the current file container 285 assigns a weight to each of the file/document features. The weight assigned to each feature indicates the clustering significance of each feature and the clustering significance of a feature indicates a likelihood that the feature can be used to successfully distinguish a first file group (a first file cluster) from a second file group (a second file cluster). In some examples, features having a greater clustering significance are assigned higher weights and features having a less clustering significance are assigned lower weights. In some examples, the type of feature used to create a feature hash can be used to determine the proper weight to assign to the feature. For example, if files are packed, then dynamic types of files features are often more meaningful in clustering such files as similar than static or binary types of file features. In such instances, the dynamic features will be assigned a higher weight than static or binary types of features.

In some examples, the document processing system is attempting to cluster samples (e.g., files/documents) based on dynamic file features, and the file features generated by the file feature generator 117 include dynamic.file events, dynamic.process events, dynamic.registry events, dynamic.network events, dynamic.other events, etc. In some examples, the feature weight assignor 210 assigns each of the features in the set a weight of either 1, 2, 3, 4 or 5. In some such examples, the features having the least clustering significance are assigned a weight of 1, the features having the most clustering significance are assigned a weight of 5, and the remaining features are assigned weights of 2, 3, or 4, based on the clustering significance of each.

In some examples, the example controller 280 causes the example feature weight assignor 210 to supply the identified features, the weights assigned to each feature, and the types of the identified features to the example hash algorithm selector 215. The hash algorithm selector 215 responds by selecting hash algorithms to be used to generate feature hashes for each feature identified by the example feature weight assignor 210. In some examples, a number of hash algorithms selected for each feature is based on the weight assigned to each feature. In some such examples, a greater number of different hash algorithms is selected for a feature that has been assigned a higher weight and a smaller number of different hash algorithms is selected for a feature assigned a lower weight. In some examples, the number of hash algorithms to be selected for a feature is equal to the weight assigned to the feature. In some such examples, the hash algorithm selector 215 will select one hash algorithm to be used to generate one feature hash for all of the features assigned a weight of 1, will select two hash algorithms to be used to generate two features hashes for all of the features assigned a weight of 2, will select three hash algorithms to be used to generate three feature hashes for all of the features assigned a weight of 3, and so on.

In some examples, when the first feature for which a hash value is to be generated is a binary type of feature (e.g., the feature is a binary feature type) that has been assigned a weight of 1, the hash algorithm selector 215 selects one hash algorithm able to generate a hash value for a binary type feature. Similarly, when the second feature is a dynamic type of feature (e.g., the feature is a dynamic feature type) that has been assigned a weight of 2, the hash algorithm selector 215 selects two different hash algorithms that are able to generate hash values for a dynamic feature. When the third feature is also a dynamic type of feature that has been assigned a weight of 3, the hash algorithm selector 215 selects three different hash algorithms that are able to generate hash values for a dynamic feature. When the fourth feature is a static type of feature that has been assigned a weight of 4, the hash algorithm selector 215 selects four different hash algorithms that are able to generate hash values for a static feature. When the fifth feature is yet another type of feature and has been assigned a weight of 5, the hash algorithm selector 215 selects five different hash algorithms that are able to generate hash values for that type of feature. Information about each of the feature hashes will later be incorporated into the fuzzy hash value. Thus, the features that are more heavily weighted will have more effect on the fuzzy hash value than features that are less heavily weighted.

Before and/or after the hash algorithms are selected, the example controller 280 causes the example threshold number determiner 220 to determine a set of threshold numbers. As described above, the fuzzy hash values generated by the fuzzy hash generator 105 each include a set of bits having a length determined by the example hash length definer 205. Further, each of the bits are set to a value of 0 or 1. When a fuzzy hash value is generated with too many bits equal to 1 or too few bits equal to 1, the ability of the fuzzy hash value to accurately represent the file for which the hash was generated can be suspect. To reduce the risk that the fuzzy hash values are not representative of the corresponding files, the example threshold bit determiner 220 determines a first threshold number of bits and a second threshold number of bits. The first threshold number of bits corresponds to an upper limit on a number of bits that can be set to a value of 1 in the fuzzy hash values to be generated by the fuzzy hash generator 105. If the total number of bits of a fuzzy hash value set to a value of 1 exceeds the first threshold number of bits, the fuzzy hash value is considered suspect. The second threshold number of bits corresponds to a lower limit on a number of bits that can be set to one in the fuzzy hash values to be generated by the fuzzy hash generator 105. When a fuzzy hash value generated by the fuzzy hash generator 105 has a number of bits set to 1 that is less than the second threshold number of bits, the fuzzy hash value is considered suspect. In contrast, fuzzy hash values having a number of bits set to a value of 1 that falls between the first and second threshold numbers of bits, will not be considered suspect. In some examples, the threshold number determiner 220 causes the first threshold number of bits to be stored in the example first threshold register 265 and causes the second threshold number of bits to be stored in the second threshold register 270.

As disclosed herein, the example fuzzy hash generator 105 generates the fuzzy hash value based on feature hashes that are generated based on features that can be any of a variety of feature types. When any one of the feature types is assigned too many bits (the number of bits assigned to static features is too high, the number of bits assigned to dynamic features is too high, the number of bits assigned to binary features is too high, etc.) the ability of the fuzzy hash value to accurately represent the file/document for which the fuzzy hash value was generated can be suspect. To reduce the risk that the fuzzy hash values are not representative of the corresponding files/documents, the controller 280 causes the example bit per type assignor 225 to determine a threshold number of bits for each feature type (also referred to as bits per type threshold numbers) included in the generation of the fuzzy hash value. Thus, if the feature weight assignor 210 identifies three different types of features that will be used to generate feature hashes, then the bit per type assignor 225 will assign three bits per type threshold numbers (one threshold number corresponding to each feature type). In some examples, the bit per type assignor 225 stores the bits per type threshold numbers in the example bits per type threshold registers 297 with information identifying the corresponding feature types. The bits per type threshold numbers will be used during generation of the fuzzy hash value to ensure that the fuzzy hash value does not have too many bits for any of the feature types, in the manner described below.

In some examples, the controller 280 causes the example feature hash generator 230 to generate a set of feature hashes. In some such examples, the feature hash generator 230 generates the set of feature hashes using the hash value algorithms selected by the example hash algorithm selector 220 for the feature. Thus, when the first feature is assigned a weight of one by the feature weight assignor 210, the hash algorithm selector 215 selects one hash algorithm corresponding to the feature type of the first feature, and the feature hash generator 230 uses the one, selected hash value algorithm to generate one feature hash for the first feature. Similarly, when the second feature is assigned a weight of two by the feature weight assignor 210, the hash algorithm selector 215 selects two different hash algorithms corresponding to the second feature type, and the feature hash generator 230 uses the two selected, different hash value algorithms to generate two hash values for the second feature. Likewise, when the third feature is assigned a weight of three by the feature weight assignor 210, the hash algorithm selector 215 selects three different hash algorithms corresponding to the feature type of the third feature, and the feature hash generator 230 uses the three selected, different hash value algorithms to generate three hash values for the third feature. Additionally, the feature hash generator 230 continues to generate feature hash values for the fourth and fifth feature in a like fashion.

Figure 3:
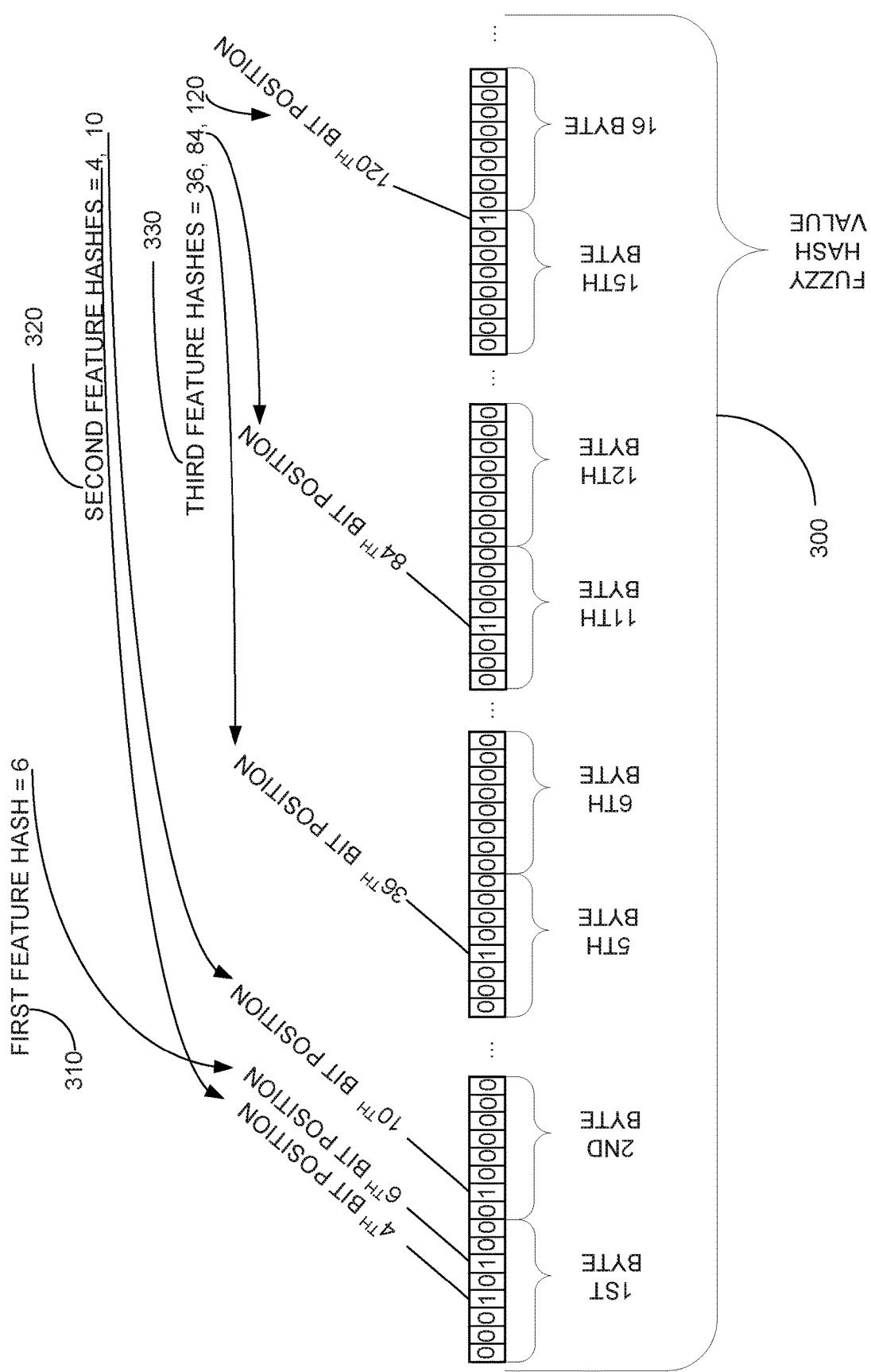
FIG. 3 is an illustration of an example fuzzy hash value a first feature hash, a second feature hash and a third feature hash.

With reference also to the fuzzy hash value 300 illustrated in FIG. 3, in some examples, the example bit setter 235 uses the feature hashes generated for each feature to set one or more bits in the fuzzy hash value register equal to one. In some examples, the bit setter 235 receives a first feature hash 310 generated by the feature hash generator 230 for a first feature. In some such examples, the bit setter 235 sets a bit in a bit position corresponding to the feature hash value to a value of one. Thus, when the first feature hash 310 generated for the first feature having a weight of one is equal to a value of 6, the bit setter 235 sets the bit in the sixth bit position of the fuzzy hash value register 275 equal to one. When second feature hashes 320 generated for the second feature are equal to 4 and 10, respectively, the bit setter 235 sets the bits of the fourth and tenth bit positions of the fuzzy hash value register 275 equal to one. When third feature hashes 330 generated for the third feature are equal to 120, 36, and 84, the bit setter 235 sets the bits of the $120^{th}$, $36^{th}$ and $84^{th}$ bit positions of the fuzzy hash value register 275 equal to one. Additionally, the bit setter 235 sets bits of the fuzzy hash value register 275 equal to one based on feature hashes generated for the fourth and fifth features in a like fashion. In some examples, the feature hashes generated for features assigned higher weights are used by the bit setter 235 to set the bits of the fuzzy hash value register 275 before the feature hashes generated for features assigned lower weight. In this manner, the feature hashes corresponding to features having a higher clustering significance are more likely to be incorporated into the fuzzy hash value than feature hashes corresponding to features having a lower clustering significance (due to the first bit threshold).

In some examples, each time the example bit setter 235 sets a bit of the fuzzy hash value register 275 in accordance with a feature hash, the example bit incrementer 240 increments one or more of the example total number of bits counter 255 and/or the example bits per type counter 260. In some examples, the total number of bits counter 255 tracks a number of bits of the fuzzy hash value register 275 that have been set to one. In some such examples, the bit setter 235 increments the total number of bits counter 255 each time a bit of the fuzzy hash value register 275 is set to one.

In some examples, the example bits per type counters 260 include a set of counters to count a number of bits set in the fuzzy hash value register 275 that correspond to the types of features. Thus, when static, dynamic and binary types of features are used to generate feature hashes, then the bits per type counters 260 include three bit counters, each corresponding to one of the feature types. In some examples, each time the example bit setter 325 sets a bit of the fuzzy hash value register 275 to one based on a feature hash, the bit incrementer 235 also increments a bit counter corresponding to the type of feature used to generate the feature hash. Thus, when the bit setter 235 sets a bit of the fuzzy hash value register 275 based on a feature hash corresponding to a static type of feature, the bit incrementer 240 increments one the bits per type counters 260 that corresponds to static features. Likewise, when the bit setter 235 sets a bit of the fuzzy hash value register 275 based on a feature hash corresponding to a dynamic type of feature, the bit incrementer 240 increments one of the bits per type counters 260 that corresponds to dynamic features. In this manner, the fuzzy hash generator 105 tracks a total number of bits of the fuzzy hash value register 275 that are set to 1 and further tracks a total number of bits of the fuzzy hash value register 275 that are set to 1 for each feature type.

In some examples, after the example bit incrementer 240 operates, the comparator 245 compares the value in the total number of bits counter 255 to the first threshold number stored in the first threshold register 265 and to the second threshold number stored in the second threshold register 270. When the comparator 245 determines that the first and second threshold numbers are satisfied (e.g., a total number of bits set to a value of 1 is less than the first threshold number and greater than the second threshold number, the fuzzy hash value in the fuzzy hash value register 275 is valid. Thus, the fuzzy hash value generator 105 continues to operate in the manner described below.

In some examples, when the comparator 245 determines that one of the first and second threshold numbers is not satisfied (e.g., the total number of bits set to 1 in the fuzzy hash value register 275 is either greater than the first threshold number or less than the second threshold number), the fuzzy hash value of the fuzzy hash value register 275 is not valid. In some such examples, the comparator 245 notifies the example fuzzy hash value supplier 250 which can respond by causing the file/document to be removed from the current file container 285 and supplied to the hash storage 120 with information indicating that the file/document does not have a fuzzy hash value. In some examples, the fuzzy hash value supplier 250 responds to the notification by causing the file/document to be removed from the current file container 285 and not supplying any information about the file to the hash storage 120.

In some examples, when the bit incrementer 240 operates, the example comparator 245 also compares the values stored in the bits per type counters to the corresponding bits per type threshold numbers stored in the bits per type threshold registers 297. When the comparator 245 determines that a number of bits set to one for a feature type satisfies the corresponding bits per type threshold number (e.g., is less than the bits per type threshold number assigned to that feature type), the comparator 245 informs the example controller 280 which causes the fuzzy hash generator 105 to continue operating. When the comparator 245 determines that a number of bits set to one for a feature type does not satisfy the corresponding bits per type threshold number (e.g., is greater than the bits per type threshold number assigned to the feature type), the comparator 245 informs the controller 280 to stop generating feature hashes for the feature type corresponding to the bits per type threshold number that is not satisfied. In response, the controller 280 causes the feature hash generator 230 to stop generating feature hashes that correspond to the feature type (or if other feature hashes corresponding to the feature type have already been generated, such features hashes are not incorporated into the fuzzy hash value). As such, no further bits of the fuzzy hash generator 105 will be set based on feature hashes corresponding to that feature type.

When all of the feature hashes have been incorporated into the fuzzy hash value (e.g., when a bit corresponding to each bit position represented by a feature hash has been set in the fuzzy hash value register 275), the controller 280 notifies the example fuzzy hash value supplier 250. The example fuzzy hash value supplier 250 responds to the notification by causing the value in the fuzzy hash value register 275 to be stored in the hash storage 120 along with the file/document (and/or file/document identifying information) in the current file container 285.

In some examples, the example controller 280 controls an order in which the hash features are generated and incorporated by the example bit setter 235 into the fuzzy hash value. In some such examples, the controller 280 uses information generated by the feature weight assignor 210 to identify all of the features, the types of the features (e.g., the feature types), and the weights assigned to the features to be used to generate a fuzzy hash value for a file/document in the current file container 285. In addition, the controller 280 selects, based on the information, a first of the weights to be processed. The controller 280 also selects, from the features assigned to the weight, a feature type and generates a feature list that includes all of the features that are the selected feature type and that have the selected weight. In some such examples, the controller 280 causes the example feature hash generator 230 to generate feature hashes for the features in the feature list on a feature-by-feature basis. The controller 280 also causes the example bit setter 235 to set a bit in a corresponding bit position of the fuzzy hash value register 275 each time a feature hash is generated, and causes the example bit incrementer 240 to increment the example total bit counter 255 and one of the example bits per type counters 260 in response to the operation of the bit setter 235. In addition, the controller 280 causes the example comparator 245 to determine whether the first and second thresholds are satisfied and whether the corresponding bits per type threshold number is satisfied. When all such operations have been performed, the controller 280 selects a next of the features identified on the feature list and causes the operations to be performed again for the next feature. When all of the features included in the feature list have been processed (e.g., feature hashes have been generated and incorporated into the fuzzy hash value register, the comparator has determined whether the corresponding threshold numbers have been satisfied, etc.), the controller identifies a next feature type to be processed (if any) and generates a new feature list that includes all of the features of that feature type that have been assigned the currently selected weight. The controller 280 then causes the features of the new feature list to be processed in the manner described above. The controller 280 continues to generate new feature lists for each feature type until all of the feature types of a selected weight have been processed. In some examples, when all of the feature types of the currently selected weight have been processed, the controller 280 selects a next weight to be processed, selects another feature type and generates yet another feature list. The controller 280 continues in this manner until all of the weights have been processed such that all of the features have been processed. Provided that the first and second threshold numbers are satisfied after all features have been processed, the controller 280 causes the example fuzzy hash value supplier 250 to supply the fuzzy hash value stored in the fuzzy hash value register 275 to the hash storage 120. In addition, the controller 280 causes the fuzzy hash value supplier to supply the file/document (or information identifying the file/document) in the example current file container 285 to the hash storage 120.

In some examples, the fuzzy hash generator 105 includes the example feature information library 290 for storing information useful to the generation of the fuzzy hash values. Such information can include identifying features, feature types, weights assigned to the features, hash algorithms, and/or any other information. In addition, information stored in the feature information library 290 can be entered via the example input device 107.

While example manners of implementing the example file processing system 100, the example file classifier 102, and the example fuzzy hash generator 105 are illustrated in FIGS. 1, and 2, one or more of the elements, processes and/or devices illustrated in FIGS. 1, and 2 may be combined, divided, re-arranged, omitted, eliminated and/or implemented in any other way. Further, the example file classifier 102 the example fuzzy hash generator 105, the example file collector 110, the example file/document storage 115, the example feature generator 117, the example hash storage 120, the example hash comparator 125, the example cluster assignor 130, the example classified file storage 135, the example malware detector 140, the example tainted file handler 145, the example hash length definer 205, the example feature weight assignor 210, the example hash algorithm selector 215, the example threshold number determiner 220, the example bits per type assignor 225, the example feature hash generator 230, the example bit setter 235, the example bit incrementer 240, the example comparator 245, the example fuzzy hash value supplier 250, the example total number of bits counter 255, the example bits per type counters 260, the example first threshold register 265, the example second threshold register 270, the fuzzy hash value register 275, the example controller 280, the example current file container 285, the example feature information library 290, the example bit clearer 295, the example bits per type threshold registers 297, the example communication bus 299, and/or, more generally, any and/or all of the example file processing system 100 of FIG. 1, the example file classifier 102 of FIG. 1, and the example fuzzy hash generator 105 of FIGS. 1 and 2, may be implemented by hardware, software, firmware and/or any combination of hardware, software and/or firmware. Thus, for example, any of the example file classifier 102 the example fuzzy hash generator 105, the example file collector 110, the example file/document storage 115, the example feature generator 117, the example hash storage 120, the example hash comparator 125, the example cluster assignor 130, the example classified file storage 135, the example malware detector 140, the example tainted file handler 145, the example hash length definer 205, the example feature weight assignor 210, the example hash algorithm selector 215, the example threshold number determiner 220, the example bits per type assignor 225, the example feature hash generator 230, the example bit setter 235, the example bit incrementer 240, the example comparator 245, the example fuzzy hash value supplier 250, the example total number of bits counter 255, the example bits per type counters 260, the example first threshold register 265, the example second threshold register 270, the fuzzy hash value register 275, the example controller 280, the example current file container 285, the example feature information library 290, the example bit clearer 295, the example bits per type threshold registers 297, the example communication bus 299, and/or, more generally, any and/or all of the example file processing system 100 of FIG. 1, the example file classifier 102 of FIG. 1, and the example fuzzy hash generator 105 of FIGS. 1 and 2, could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example file classifier 102 the example fuzzy hash generator 105, the example file collector 110, the example file/document storage 115, the example feature generator 117, the example hash storage 120, the example hash comparator 125, the example cluster assignor 130, the example classified file storage 135, the example malware detector 140, the example tainted file handler 145, the example hash length definer 205, the example feature weight assignor 210, the example hash algorithm selector 215, the example threshold number determiner 220, the example bits per type assignor 225, the example feature hash generator 230, the example bit setter 235, the example bit incrementer 240, the example comparator 245, the example fuzzy hash value supplier 250, the example total number of bits counter 255, the example bits per type counters 260, the example first threshold register 265, the example second threshold register 270, the fuzzy hash value register 275, the example controller 280, the example current file container 285, the example feature information library 290, the example bit clearer 295, the example bits per type threshold registers 297, and the example communication bus 299 is/are hereby expressly defined to include a non-transitory computer readable storage device or storage disk such as a memory, a digital versatile disk (DVD), a compact disk (CD), a Blu-ray disk, etc. including the software and/or firmware. Further still, any and/or all of the example file processing system 100 of FIG. 1, the example file classifier 102 of FIG. 1, and the example fuzzy hash value generator 105 of FIG. 1 and FIG. 2 may include one or more elements, processes and/or devices in addition to, or instead of, those illustrated in the FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
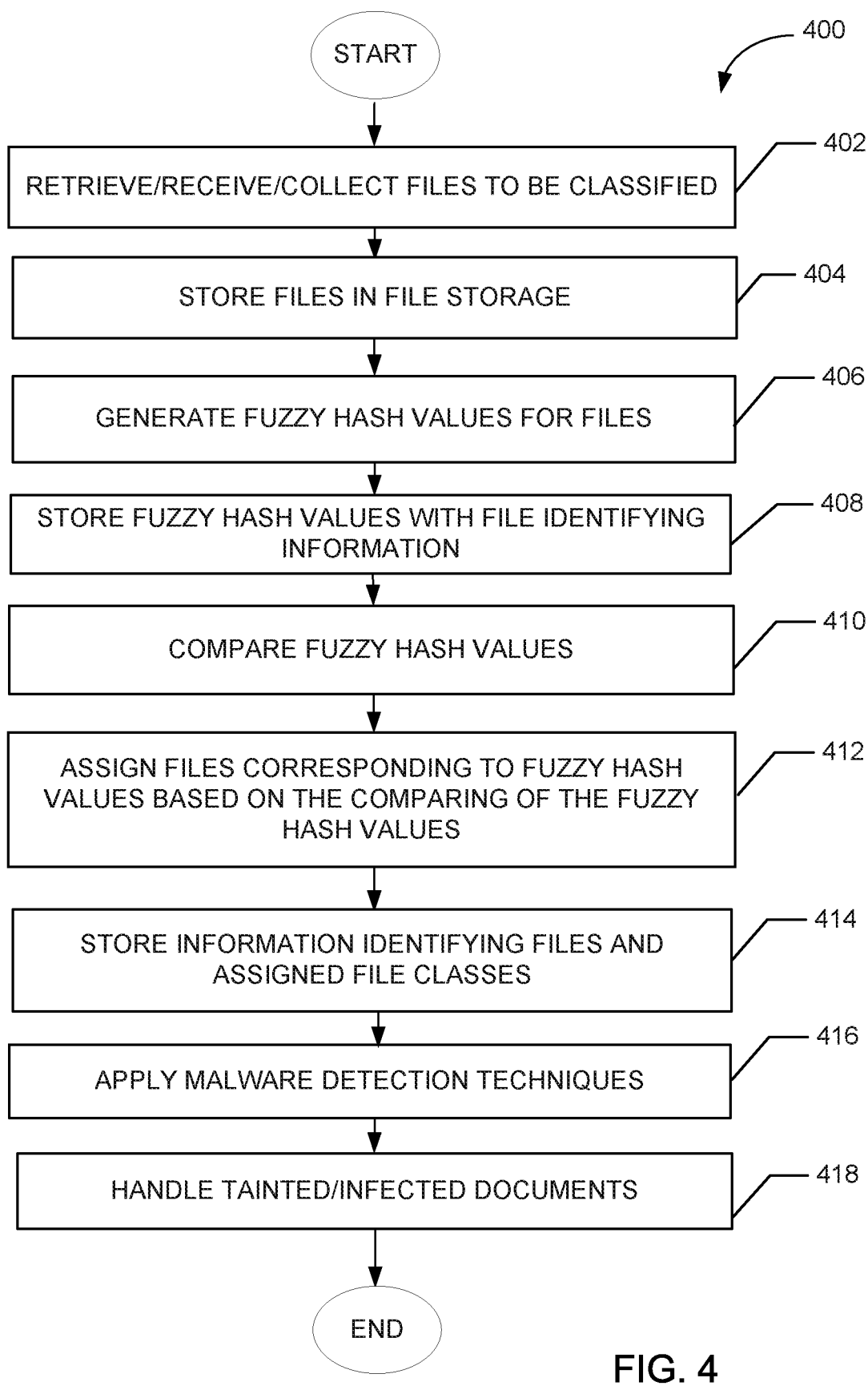
FIG. 4 is a flowchart representative of machine readable instructions which may be executed to implement the example file classifier of FIG. 1.
Figure 5A:
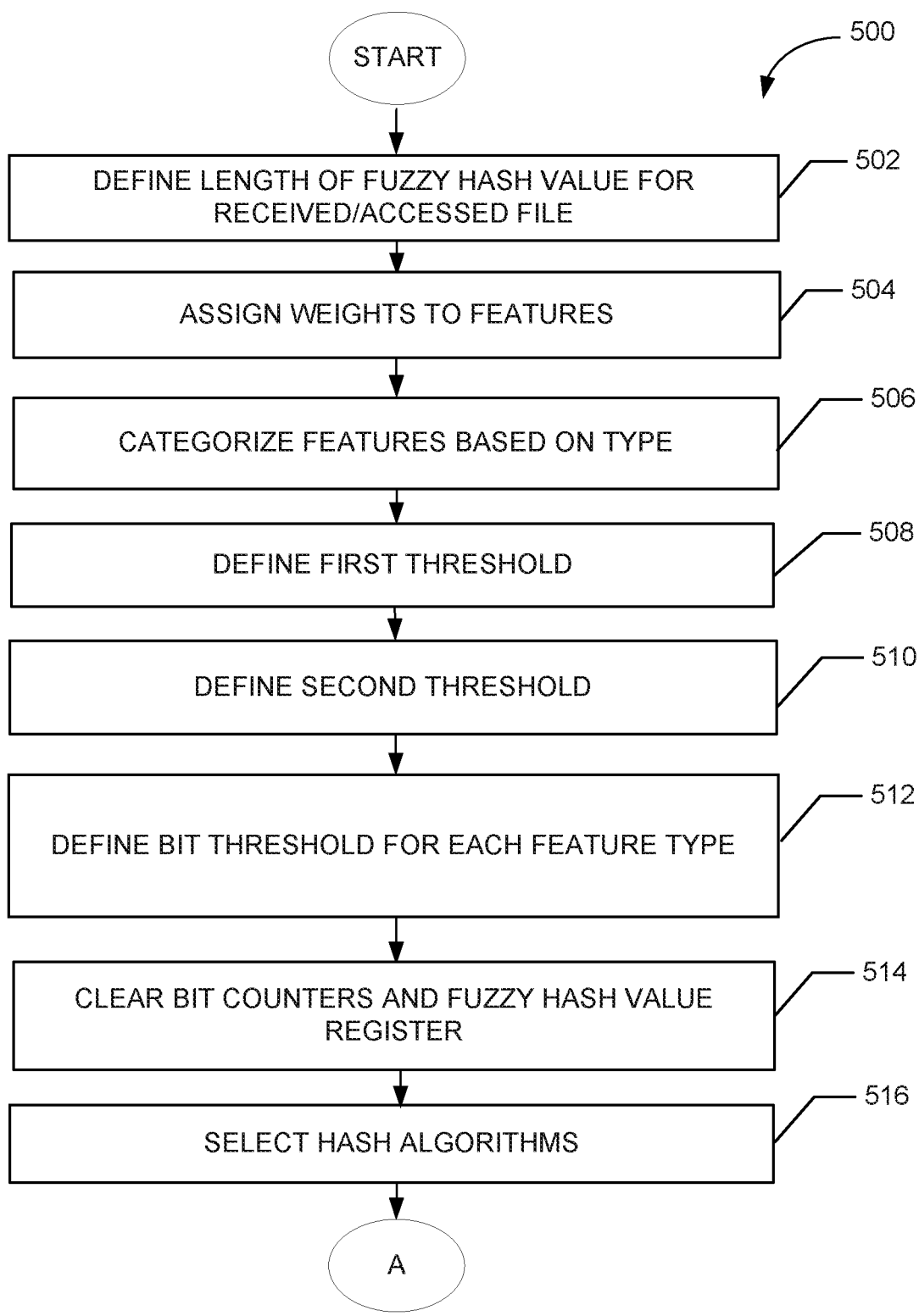
FIG. 5A, FIG. 5B, and FIG. 5C is a flowchart representative of machine readable instructions which may be executed to implement the example fuzzy hash generator of FIG. 2.
Figure 5B:
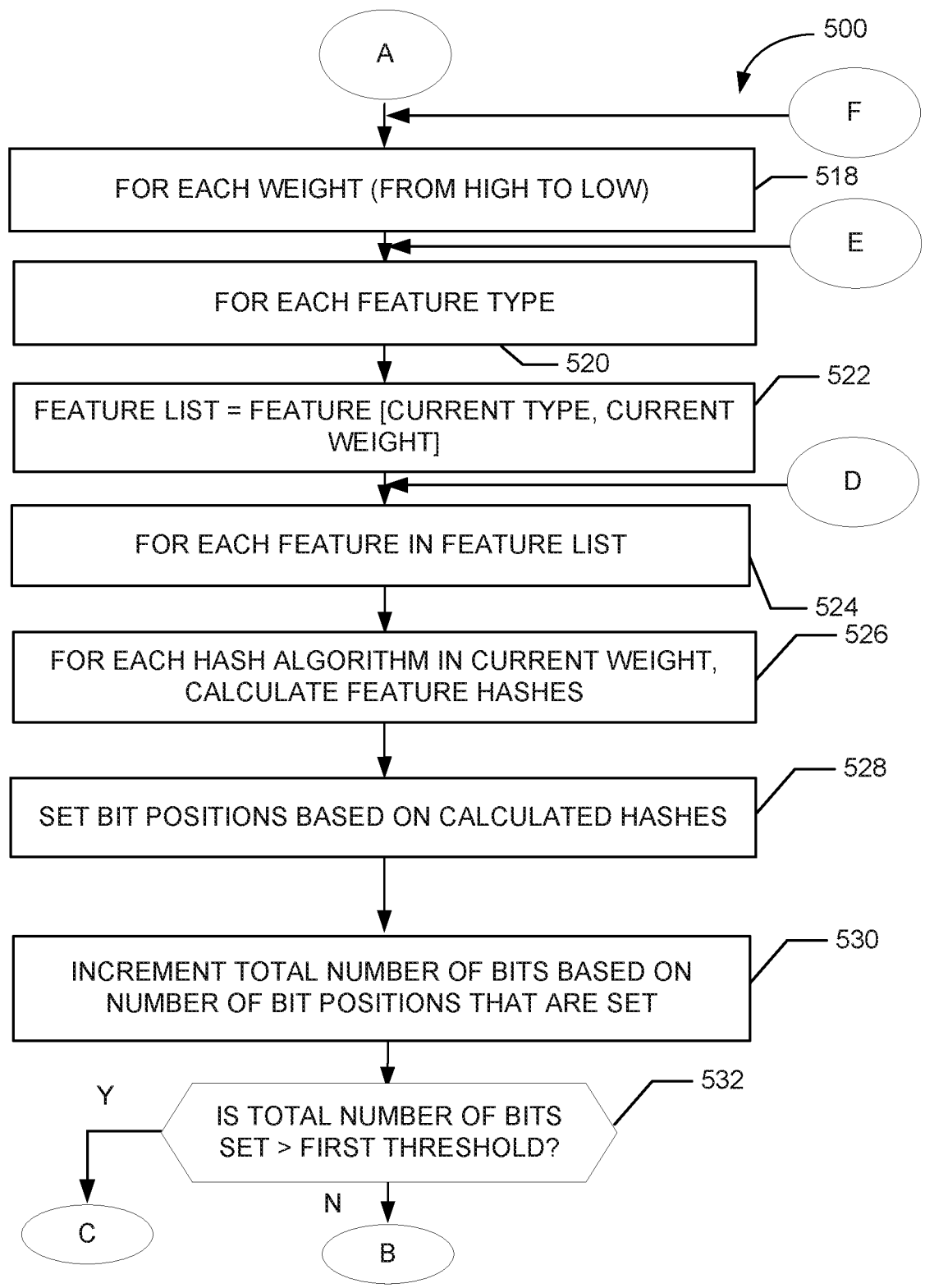
Figure 5C:
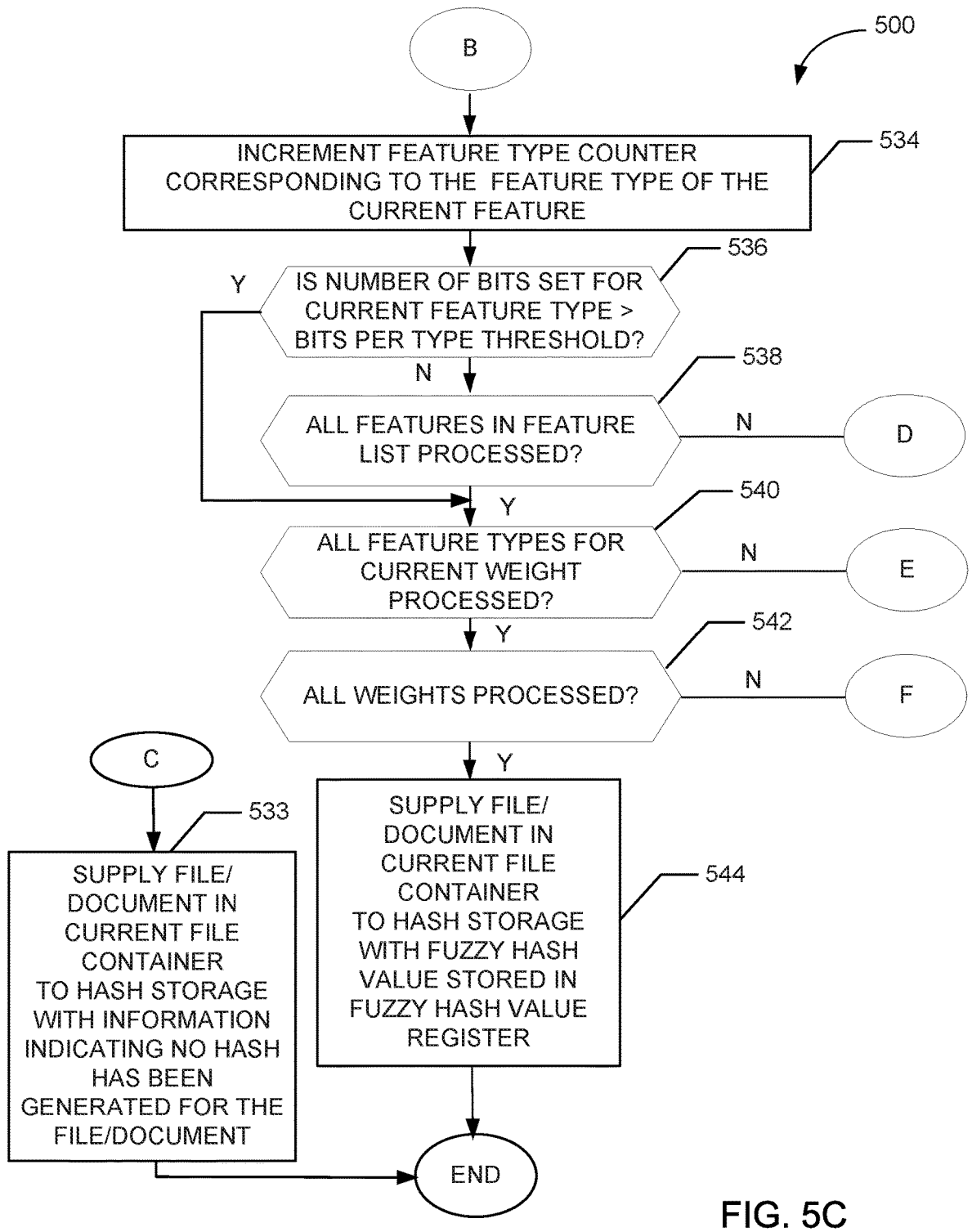

A flowchart representative of example hardware logic or machine readable instructions for implementing the example file processing system 100 of FIG. 1 is shown in FIG. 4. A flowchart representative of example hardware logic or machine readable instructions for implementing the example fuzzy hash generator 105 of FIG. 1 and FIG. 2 is shown in FIGS. 5A, 5B and 5C. The machine readable instructions may be a program or portion of a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program(s) are described with reference to the flowcharts illustrated in FIGS. 4, 5A, 5C and 5C, many other methods of implementing the example file processing system 100 of FIG. 1, the example file classifier 102 of FIG. 1, and the example fuzzy hash generator 105 of FIG. 1 and FIG. 2, may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4, 5A, 5B, and 5C may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program 400 of FIG. 4 begins at a block 402 at which the example file collector 110 collects or receives files to be classified into one or more categories of file/document types, file/document classes, and/or file/document clusters. The file collector 110 stores the collected files in the example file/document storage 115 for retrieval by the fuzzy hash generator 105 (block 404). The fuzzy hash generator 105 generates a fuzzy hash value for the files stored in the file storage (block 406). The fuzzy hash generator 105 supplies the fuzzy hash values to the hash storage 120 where the fuzzy hash values are stored along with information identifying the files for which the fuzzy has values were generated (block 408).

In some examples, the example hash comparator 125 compares the fuzzy hash values stored in the example hash storage 120 (block 410). When a comparison between two fuzzy hash values yields a similarity value that meets a similarity threshold, the example cluster assignor 130 assigns the files corresponding to each of the fuzzy hash values to a same file cluster (block 412). In some examples, the hash comparator 125 uses the Jaccard function to calculate the similarity value, as described above with reference to FIG. 1. In some examples, the cluster assignor 130 causes the files/documents to be stored in the example classified file storage 135 with information identifying the file/document cluster to which the corresponding files were assigned (block 414). In some examples, the example malware detector 140 determines whether the clusters contain files that are associated with malware by applying any of a variety of malware detection techniques (block 416). The example tainted file handler 145 takes any of a number of actions relative to the files determined to be associated with malware including, quarantine actions, delete actions and/or repair actions (block 418). Thereafter, the program 400 ends.

The program 500 of FIGS. 5A, 5B, and 5C begins at a block 502 at which the example hash length definer 205 receives a file from the file collector 110. In some examples, the hash length definer 205 accesses the file from the file/document storage 115. The hash length definer 205 defines a hash length that specifies a number of bytes to be included in a fuzzy hash value to be generated based on the file (also at the block 502). In some examples, the fixed length is defined based on a storage limit of the example hash storage 120 (see FIG. 1).

The example feature weight assignor 210 (see FIG. 2) assigns a weight to each of the features for which feature hashes are to be generated. As described above, the features for the file/document currently being processed may reside in the current file container 290. The weight assigned to the features indicates the clustering significance of each feature which indicates a likelihood that the feature can be used to successfully distinguish a first cluster of files from a second cluster of files. Features having a greater clustering significance can be assigned higher weights and the features having a less clustering significance can be assigned lower weights. In some examples, the feature weight assignor 210 also determines the type of each selected feature (block 506) and categorizes the features based on the type (e.g., dynamic, static, binary, etc.).

The example threshold bit determiner 220 determines a first threshold number of bits (block 508) and a second threshold number of bits (block 510). The first threshold number of bits corresponds to an upper limit on a number of bits that can be set to a value of 1 in the fuzzy hash values to be generated by the fuzzy hash generator 105. The second threshold number of bits corresponds to a lower limit on a number of bits that can be set to one in the fuzzy hash values to be generated by the fuzzy hash generator 105. The first and second thresholds can be set to any desired level. In some examples, the threshold bit determiner 220 causes the first threshold number of bits and the second threshold number of bits to be stored in the first and second threshold registers 265, 270 (See FIG. 2).

In some examples, the example bit per type assignor 225 determines a threshold number of bits for each feature type of the feature types for which hash values are to be generated (block 512). If three types of features are included in the features selected by the feature weight assignor 210, the example bit per type assignor 225 determines three threshold numbers of bits, one corresponding to each of the feature types. In some examples, the threshold number per feature type can be selected based on the fixed length of the fuzzy hash value and the number of feature types for which feature hashes are generated. In some such examples, the threshold bits per type is determined by dividing the first threshold number (representing the upper limit of bits that can be set in the fuzzy hash value register) by the number of different types of features included in the fuzzy hash value. In such examples, each of the different types of features is permitted the same threshold number of bits per type. In some examples, the bit per type assignor 225 stores the threshold numbers of bits per type in the example bits per type threshold registers 297.

The example bit clearer 295 clears the bits stored in the example fuzzy hash value register 275 by setting the bits of the fuzzy hash value register 275 to zero. Setting the bits of the fuzzy hash value register 275 to zero ensures that any bits of the fuzzy hash value register 275 that were set in connection with a previously generated fuzzy hash values are discarded. In some examples, the bit clearer 295 also clears the bits stored in the example total number of bits counter 255 and the example bits per type counters 260 (also at block 514). As described with reference to FIG. 2, the total number of bits counter 255 and the bits per type counters 260 can be used to track a total number of bits that have been set in the fuzzy hash value, and total numbers of bits that have been set per feature type, so that the numbers of bits that have been set can be compared to the thresholds (e.g., the first threshold number, and the second threshold number, and the bits per type threshold numbers, etc.).

In some examples, the example hash algorithm selector 215 selects hash algorithms to be used to generate hash values for the features (block 516). In some examples, a number of hash algorithms selected for each feature is based on the weight assigned to each feature. In some such examples, a greater number of different hash algorithms is selected for a feature that has been assigned a higher weight and a smaller number of different hash algorithms is selected for a feature assigned a lower weight. In some examples, the number of hash algorithms to be selected for a feature is equal to the weight assigned to the feature. In some such examples, the hash algorithm selector 215 selects one hash algorithm for a first feature assigned a weight of 1, selects two hash algorithms for a second feature assigned a weight of 2, selects three hash algorithms for a third feature assigned a weight of 3, and so on. The feature weight assignor 210 also selects hash algorithms to be used to generate hash values for a feature based on the type of the feature. Hash algorithms suited to generating hash values for dynamic types of features are selected for dynamic types of features, hash algorithms suited to generating hash values for static types of features are selected for static types of features, and hash algorithms suited to generating hash values for binary types of features are selected for binary types of features.

In some examples, when the first feature for which a hash value is to be generated is a binary type of feature (e.g., the feature is a binary feature type) that has been assigned a weight of 1, the hash algorithm selector 215 selects one hash algorithm able to generate a hash value for a binary type feature. Similarly, when the second feature is a dynamic type of feature (e.g., the feature is a dynamic feature type) that has been assigned a weight of 2, the hash algorithm selector 215 selects two different hash algorithms to generate hash values for a dynamic feature. When the third feature is also a dynamic type of feature that has been assigned a weight of 3, the hash algorithm selector 215 selects three different hash algorithms to generate hash values for a dynamic feature. When the fourth feature is a static type of feature that has been assigned a weight of 4, the hash algorithm selector 215 selects four different hash algorithms to generate hash values for a static feature. When the fifth feature is yet another type of feature and has been assigned a weight of 5, the hash algorithm selector 215 selects five different hash algorithms to generate hash values for that type of feature. In some examples, one or more of the algorithms can be used to generate feature hashes for any of a number of different types of features.

In some examples, the example controller 280 controls an order in which features hashes are generated for the selected features. In some such examples, the controller 280 identifies the weights assigned to the features and selects one of the weights (block 518). In addition, the controller 280 identifies the feature types included in the selected weight and selects one of the feature types (block 520). Using the selected weight and the selected feature type, the controller 280 generates a feature list containing all of the features in the selected weight having the selected feature type (block 522). The controller selects one of the features in the feature list (block 524), and the example feature hash generator 230 generates/calculates feature hashes for the feature using each of the algorithms assigned to the feature (block 526). In some examples, the selected feature is weighted with a value of 3 and thus has been assigned three different hash algorithms. In some such examples, the feature hash generator 230 generates three feature hashes for the feature using the three different hash algorithms.

In some examples, the example bit setter 235 uses the feature hashes generated for the feature to set bit(s) of a fuzzy hash value equal to one (block 528). In some such examples, the bit setter 235 sets bits in the fuzzy hash value register 275 that are located in bit positions corresponding to the values of the feature hashes (e.g., a bit located in the $N^{th}$ bit position of the fuzzy hash value register 275 is set to 1 when a feature hash value is equal to N). As illustrated in FIG. 3, when a first feature hash 310 generated for the first feature having a weight of one is equal to a value of 6, the bit setter 235 sets the bit in the sixth bit position of the fuzzy hash value register 275 equal to one. When second feature hashes 320 generated for the second feature are equal to 4 and 10, the bit setter 235 sets the bits of the fourth and tenth bit positions of the fuzzy hash value register 275 equal to one. When third feature hashes 330 generated for the third feature are equal to 120, 36, and 84, the bit setter 235 sets the bits of the $120^{th}$, $36^{th}$ and $84^{th}$ 64 bit positions of the fuzzy hash value register 275 equal to one. Additionally, the bit setter 235 sets bits of the fuzzy hash value register 275 equal to one based on feature hashes generated for the fourth and fifth features in a like fashion.

In some examples, when the example bit setter 235 sets a bit of the fuzzy hash value in accordance with a value of a feature hash, the example bit incrementer 240 increments the example total number of bits counter 255 that is used to track a total number of bits of the fuzzy hash value that are set equal to one (block 530). The example comparator 245 determines whether the first threshold number is satisfied by comparing the value stored in the example total number of bits counter 255 (see FIG. 2) to the first threshold number stored in the first threshold register 265 (block 532). When the value stored in the total number of bits counter 255 is greater than the first threshold number, the first threshold number is not satisfied, and the fuzzy hash value is considered suspect (e.g., a potentially inaccurate representation of the file) and will not be stored. As a result, the controller 280 causes the example fuzzy hash value supplier 250 to supply file/document in current file container to the example hash storage 120 with information indicating no fuzzy hash value has been generated for the file/document (block 533), as indicated by the connection point C illustrated in FIG. 5B and FIG. 5C. Thereafter, the controller 280 causes the program 500 to end.

When the first threshold number of bits is satisfied (e.g., the value stored in the total number of bits counter 255 is not greater than the first threshold number), the example bit incrementer 240 increments a value stored in a counter corresponding to the feature type of the feature currently being processed (block 534). To determine whether the threshold number of bits set for the current feature type has been satisfied, the comparator 245 compares the value stored in one of the bits per type counters 260 corresponding to the corresponding to the current feature type (block 536) to a corresponding bits per type threshold number stored in the bits per type threshold registers 297. When the bits per type threshold number corresponding to the current feature type is satisfied (e.g., the value stored in the bits per type counter 260 corresponding to the current feature type is not greater than the threshold number of bits corresponding to the current feature type), the example controller 280 determines whether all of the features included in the feature list have been processed (block 538). When the controller 280 determines that not all of the bit features in the feature list have been processed, the controller 280 causes the program 500 to return to the block 524 and blocks subsequent thereto (as described above) until all of the features in the feature list have been processed.

When the example comparator 245 determines the bits per type threshold number corresponding to the current feature type is not satisfied (e.g., the value stored in the bits per type counter 260 corresponding to the current feature type is greater than the threshold number of bits corresponding to the current feature type), the example controller 280 causes the program to continue at the block 540 (thereby causing the program to skip the block 538) such that no further feature hashes are generated for the current feature list. As a result, no additional feature hashes corresponding to the current feature type for the current weight will contribute to the fuzzy hash value. Thus, a limit on the number of bits associated with the current feature type that can be set to one is enforced. In some examples, the controller 280 also keeps a list of any feature types that are no longer permitted to contribute to the fuzzy hash value and thereafter foregoes creating any feature lists (for other weights) that correspond to any such feature types so that the bit per type threshold limit is enforced.

When the controller 280 determines that all of the features in the feature list have been processed, the controller 280 determines whether all of the types of features in the currently selected weight have been processed (block 540). When the controller 280 determines that all of the types of features (e.g., feature types) of the currently selected weight have not been processed, the controller 280 causes the program 500 to return to the block 520 and blocks subsequent thereto (as described above) until all of the types of features in the currently selected weight have been processed. When all of the types of features (e.g., feature types) of the currently selected weight have been processed, the controller 280 determines whether all of the weights have been processed (block 542). When the controller 280 determines that all of the weights have not been processed, the controller 280 causes the program 500 to return to the block 518 and the blocks subsequent thereto (as described above) until all of the weights have been processed. When the controller 280 determines that all of the weights have been processed, the controller 280 causes the example fuzzy hash value supplier 250 to supply the file/document in the example current file container 285 to the example hash storage 120 with the fuzzy hash value stored in the example fuzzy hash value register 275 (block 544). Thereafter, the fuzzy hash value generating process is complete and the controller 280 causes the program 500 to end.

Figure 6:
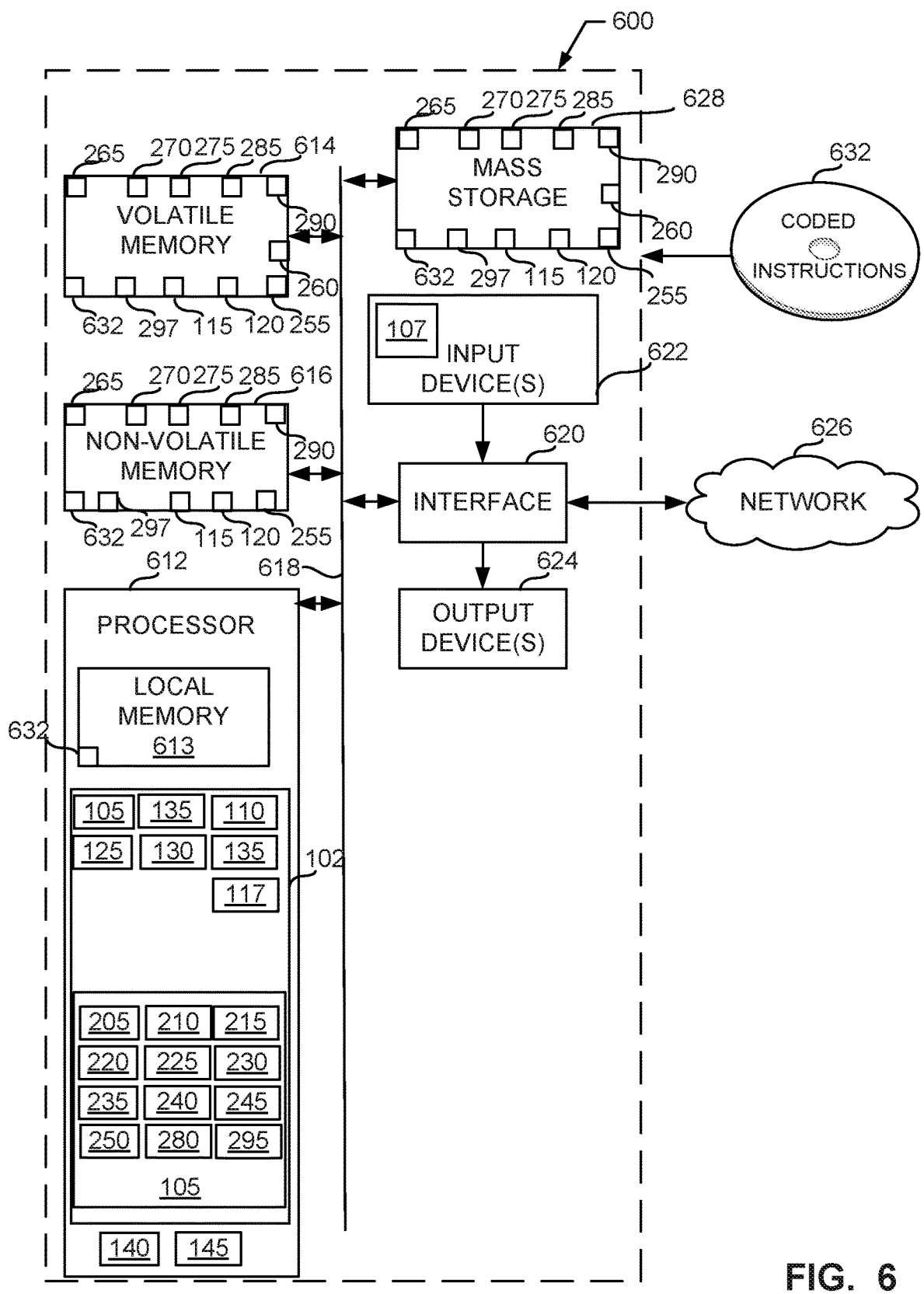
FIG. 6 is a block diagram of an example processing platform structured to execute the instructions of FIG. 4 and FIGS. 5A, 5B, and 5C.

FIG. 6 is a block diagram of an example processor platform 600 structured to execute the instructions of FIG. 4 and FIGS. 5A, 5B, and 5C to implement the file handling system and the fuzzy hash generator of FIG. 1, and FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the example file classifier 102, the example fuzzy hash generator 105, the example file collector 110, the example hash comparator 125, the example cluster assignor 130, the example classified file storage 135, the example malware detector 140, the example tainted file handler 145, the example hash length definer 205, the example feature weight assignor 210, the example hash algorithm selector 215, the example threshold number determiner 220, the example bits per type assignor 225, the example feature hash generator 230, the example bit setter 235, the example bit incrementer 240, the example comparator 245, the example fuzzy hash value supplier 250, the example controller 280, and the example bit clearer 295.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system. In some examples, the input device(s) 622 is used to implement the example input device 107.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives. Any of the local memory 613 and/or the volatile memory 614 can be used to implement the example file/document storage 115, the example hash storage 120, the example first threshold register 265, the example second threshold register 270, the fuzzy hash value register 275, the example total number of bits counter 255, the example bits per type counters 260, the example feature information library 290, the example current file container 285, and the example bits per type threshold registers 297. Any of the volatile memory 1014, the non-volatile memory 1016, and the mass storage 1028 can be used to implement the example file/document storage 115, the example hash storage 120, the example first threshold register 265, the example second threshold register 270, the fuzzy hash value register 275, the example total number of bits counter 255, the example bits per type counters 260, the example feature information library 290, the example current file container 285, and the example bits per type threshold registers 297.

The machine executable instructions 632 of FIGS. 4, 5A, 5B and 5C may be stored in the mass storage device 628, in the volatile memory 614, in the non-volatile memory 616, and/or on a removable non-transitory computer readable storage medium such as a CD or DVD.

The fuzzy hash values generated by the example fuzzy hash generator 105 of the file processing system and method 100 disclosed herein are able to more accurately represent files/documents and, as a result, are better at classifying files as similar or different. Unlike conventional hash values which are typically generated based on a single type of feature, the fuzzy hash values disclosed herein can be based on multiple types features. Further, unlike conventional hash values which typically give equal weight to the features, the fuzzy hash generator 105 gives more weight to different features and/or to different types of features. The ability to generate fuzzy hash values that are based on multiple file feature types, and multiple features, as well as the ability to give greater weight to features that more likely to be useful in distinguishing one file from another results in fuzzy hash values that are superior to conventional hash values that are currently used to perform file classification.

The following further examples are disclosed herein.

Example 1 is an apparatus to classify a first file and includes a feature hash generator to generate respective sets of one or more feature hashes for respective features of the first file. The number of the one or more feature hashes to be generated is based on an ability of the feature to distinguish the first file from a second file. The apparatus also includes a bit setter to set respective bits of a first fuzzy hash value based on respective ones of the one or more feature hashes, and a classifier to assign the first file to a class associated with a second file based on a similarity between the first fuzzy hash value and a second fuzzy hash value for a second file.

Example 2 includes the apparatus of Example 1, and further includes a feature weight assignor to assign one of a plurality of weights to respective ones of the respective features based on a clustering significance of the respective features.

Example 3 includes the apparatus of Example 2, and further includes a hash algorithm selector to select, for the respective features, a set of one or more different hash algorithms. In Example 3, the number of hash algorithms selected for the respective features is based the respective weights.

Example 4 includes the apparatus of Example 3, and in the apparatus of Example 4, the hash algorithm selector selects the hash algorithms based on the types of the respective features.

Example 5 includes the apparatus of Example 4, and in the apparatus of Example 5, the feature hashes generated for a respective feature are based on different hash algorithms.

Example 6 includes the apparatus of Example 1, and further includes a threshold bit determiner to determine a threshold number of bits, and a comparator. In Example 6, the comparator compares the threshold number of bits to a first number of bits of the first fuzzy hash value set to a first bit value, and, causes the fuzzy hash value to be discarded when the threshold number of bits is not satisfied.

Example 7 includes the apparatus of Example 1, and in the apparatus of Example 7, the bit setter is further to set the respective bits of the first fuzzy hash value based on respective bit positions of the respective bits. In Example 7, the bit positions correspond to the feature hashes.

Example 8 is one or more non-transitory machine-readable media including instructions that, when executed by one or more processors, cause the one or more processors to at least generate a number of feature hashes for a feature of at least one of a first file or a first file. In Example 8, the number of the feature hashes is based on an ability of the feature to distinguish the first file from other files. The instructions of Example 8 further cause the one or more processors to generate a first fuzzy hash value for the first file using the feature hashes, and determine a similarity value between the first file and at least one of the other files based on the first fuzzy hash value and a second fuzzy hash value. In Example 8, the second fuzzy hash value is generated for at least one of the other files and the similarity value identifies an amount of similarity between the first file and the at least one of the other files.

Example 9 includes the one or more non-transitory machine readable media of Example 8, and in Example 9, the instructions further cause the one or more processors to generate the first fuzzy hash value by setting respective bits of the first fuzzy hash value based on respective ones of the feature hashes.

Example 10 includes the one or more non-transitory machine readable media of Example 9, and in Example 10, the instructions further cause the one or more processors to set the respective bits of the first fuzzy hash value based on respective bit positions occupied by the respective bits. In Example 10, the respective bit positions correspond to the feature hashes.

Example 11 includes the one or more non-transitory machine readable media of Example 8, and in Example 11 the instructions further cause the one or more processors to assign a weight to the first feature. In Example 11, the weight reflects the ability of the first feature to distinguish the first file from the other files.

Example 12 includes the non-transitory machine readable media of Example 11, and in Example 12 the instructions further cause the one or more processors to select, for the first feature, respective different hash algorithms to be used to generate respective ones of the feature hashes.

Example 13 includes the non-transitory machine readable media of Example 12, and in Example 12, the instructions further cause the one or more processors to generate, based on the first file, the first feature, and select the hash algorithms used to generate the hash values based on the a feature type of the first feature.

Example 14 includes the non-transitory machine readable media of Example 8, and in Example 8 the number is a first number. Also, in Example 8, the instructions further cause the one or more processors to determine a threshold number of set bits, determine whether a second number of bits set to a first bit value in the first fuzzy hash value satisfies the threshold number of set bits, and, when the threshold number of bits is satisfied, cause the first fuzzy hash value to be stored with information identifying the first file.

Example 15 is a method to classify a file that includes generating, by executing an instruction with one or more processors, respective sets of feature hashes for respective features of a file, respective numbers of feature hashes, and setting, by executing an instruction with the one or more processors, respective bits of a fuzzy hash register based on respective ones of the feature hashes. The method of Example 15 also includes classifying, by executing an instruction with the one or more processors, the file based on a fuzzy hash value contained in the fuzzy hash register.

Example 16 includes the method of Example 15, and in Example 16, the generating of the respective sets of feature hashes includes generating the respective sets of feature hashes to include respective numbers of feature hashes for the respective features, the respective numbers based on a clustering significance of the respective feature.

Example 17 includes the method of Example 15, and further includes generating the respective features of the file to be used to generate the respective sets of feature hashes, and assigning respective weights to the respective features. In the method of Example 17, the respective weights are based on a clustering significance of the respective features.

Example 18 includes the method of Example 15, and in the method of Example 18, the file is a first file, and the classifying of the first file includes generating a similarity value. In Example 18, the similarity value indicates an amount of similarity between the first file and a second file. The second file of Example 18 belongs to a first class of files. The method of Example 18 further includes, when the similarity value satisfies a similarity threshold, causing the first file to be classified in the first class of files.

Example 19 includes the method of Example 18, and in Example 18 the first class of files is determined to be associated with malware. Also, the method of Example 18 further includes causing the first file to be at least one of deleted or isolated when the first file is classified in the first class of files.

Example 20 includes the method of Example 15, and further includes determining respective feature types of the respective features, and selecting, based on the respective feature types, hash algorithms to be used to generate the respective sets of feature hashes for the respective features.

Example 21 includes the method of Example 15, and in Example 15, the generating of the respective sets of feature hashes for the respective features includes generating the features hashes included in ones of the respective sets of feature hashes using different hash algorithms.

Example 22 includes the method of Example 15 and further includes determining whether a first number of bits set in the fuzzy hash register satisfies a threshold number of bits, and, when the threshold number of bits is not satisfied, causing a fuzzy hash value stored in the fuzzy hash value to be discarded.

Example 23 includes the method of Example 15, and in the method of Example 23, the setting of the respective bits of the fuzzy hash register includes setting the respective bits of the fuzzy hash register based on respective bit positions of the respective bits. In Example 23, the bit positions correspond to the feature hashes.

Example 24 includes the method of Example 15, and in the method of Example 24, the setting of the respective bits of the fuzzy hash register includes setting the respective bits of the fuzzy hash register based on respective bit positions of the respective bits. In Example 24, the bit positions correspond to the feature hashes.

Example 25 includes the method of Example 15, and the method of Example 25 further includes subjecting the file to a malware protocol based on the classifying of the file.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to classify a first file, the apparatus comprising:
    a feature hash generator to generate respective sets of one or more feature hashes for respective features of the first file, a number of the one or more feature hashes in a first set for a first feature to be generated based on an ability of the first feature to distinguish the first file from a second file;
    a bit setter to set respective bits of a first fuzzy hash value based on respective ones of the one or more feature hashes in the first set; and
    a classifier to assign the first file to a class associated with a second file based on a similarity between the first fuzzy hash value and a second fuzzy hash value for the second file.

2. The apparatus of claim 1, further including a feature weight assignor to assign one of a plurality of weights to respective ones of the respective features based on a clustering significance of the respective features.

3. The apparatus of claim 2, further including a hash algorithm selector to select, for the respective features, a set of one or more different hash algorithms, a number of hash algorithms selected for the respective features based on the respective weights.

4. The apparatus of claim 3, wherein the hash algorithm selector is to select the hash algorithms based on types of the respective features.

5. The apparatus of claim 1, wherein the feature hashes generated for the first feature are based on different hash algorithms.

6. The apparatus of claim 1, further including:
    a threshold bit determiner to determine a threshold number of bits; and
    a comparator to:
        compare the threshold number of bits to a first number of bits of the first fuzzy hash value set to a first bit value; and,
        cause the first fuzzy hash value to be discarded when the threshold number of bits is not satisfied.

7. The apparatus of claim 1, wherein the bit setter is further to set the respective bits of the first fuzzy hash value based on respective bit positions of the respective bits, the bit positions corresponding to the feature hashes.

8. One or more non-transitory machine-readable media including instructions that, when executed by one or more processors, cause the one or more processors to at least:
generate a number of feature hashes for a first feature of a first file, the number of the feature hashes based on an ability of the feature to distinguish the first file from other files;
generate a first fuzzy hash value for the first file using the feature hashes; and
determine a similarity value between the first file and at least one of the other files based on the first fuzzy hash value and a second fuzzy hash value generated for at least one of the other files, the similarity value identifying an amount of similarity between the first file and the at least one of the other files.

9. The one or more non-transitory machine readable media of claim 8, wherein the instructions further cause the one or more processors to generate the first fuzzy hash value by setting respective bits of the first fuzzy hash value based on respective ones of the feature hashes.

10. The one or more non-transitory machine readable media of claim 9, wherein the instructions further cause the one or more processors to set the respective bits of the first fuzzy hash value based on respective bit positions occupied by the respective bits, the respective bit positions corresponding to the feature hashes.

11. The one or more non-transitory machine readable media of claim 8, wherein the instructions further cause the one or more processors to assign a weight to the first feature, the weight reflecting the ability of the first feature to distinguish the first file from the other files.

12. The non-transitory machine readable media of claim 11, wherein the instructions further cause the one or more processors to select, for the first feature, respective different hash algorithms to be used to generate respective ones of the feature hashes.

13. The non-transitory machine readable media of claim 12, wherein the instructions further cause the one or more processors to:
generate, based on the first file, the first feature; and
select the hash algorithms used to generate the respective ones of the feature hashes based on a feature type of the first feature.

14. The non-transitory machine readable media of claim 8, wherein the number is a first number, and the instructions further cause the one or more processors to:
determine a threshold number of set bits;
determine whether a second number of bits set to a first bit value in the first fuzzy hash value satisfies the threshold number of set bits; and,
when the threshold number of bits is satisfied, cause the first fuzzy hash value to be stored with information identifying the first file.

15. A method to classify a file, the method comprising:
generating, by executing an instruction with one or more processors, respective sets of feature hashes for respective features of a file, a number of the feature hashes in a first set of feature hashes being generated for a first feature based on an ability of the first feature to distinguish the file from other files;
setting, by executing an instruction with the one or more processors, respective bits of a fuzzy hash register based on respective ones of the feature hashes in the first set of feature hashes; and
classifying, by executing an instruction with the one or more processors, the file based on a fuzzy hash value contained in the fuzzy hash register.

16. The method of claim 15, wherein the generating of the respective sets of feature hashes includes generating the respective sets of feature hashes to include respective numbers of feature hashes for the respective features, the respective numbers based on a clustering significance of the respective feature.

17. The method of claim 15, further including:
generating the respective features of the file to be used to generate the respective sets of feature hashes; and
assigning respective weights to the respective features, the respective weights based on a clustering significance of the respective features.

18. The method of claim 15, wherein the file is a first file, and the classifying of the first file includes:
generating a similarity value, the similarity value indicating an amount of similarity between the first file and a second file, the second file belonging to a first class of files; and
when the similarity value satisfies a similarity threshold, causing the first file to be classified in the first class of files.

19. The method of claim 18, wherein the first class of files is determined to be associated with malware, and the method further includes causing the first file to be at least one of deleted or isolated when the first file is classified in the first class of files.

20. The method of claim 15, further including:
determining respective feature types of the respective features; and
selecting, based on the respective feature types, hash algorithms to be used to generate the respective sets of feature hashes for the respective features.

21. The method of claim 15, wherein the generating of the respective sets of feature hashes for the respective features includes generating the features hashes included in ones of the respective sets of feature hashes using different hash algorithms.

22. The method of claim 15, further including:
determining whether a first number of bits set in the fuzzy hash register satisfies a threshold number of bits; and
when the threshold number of bits is not satisfied, causing the fuzzy hash value stored in the fuzzy hash register to be discarded.

23. The method of claim 15, wherein the setting of the respective bits of the fuzzy hash register includes setting the respective bits of the fuzzy hash register based on respective bit positions of the respective bits, the bit positions corresponding to the feature hashes.

24. The method of claim 15, further including subjecting the file to a malware protocol based on the classifying of the file.

* * * * *